United States Patent [19]

Sprenger

[11] Patent Number: 4,568,548

[45] Date of Patent: Feb. 4, 1986

[54] CHEESE SPREADS

[75] Inventor: Max Sprenger, Bruetten, Switzerland

[73] Assignee: CPC International Inc., Englewood Cliffs, N.J.

[21] Appl. No.: 641,362

[22] Filed: Aug. 15, 1984

Related U.S. Application Data

[60] Continuation of Ser. No. 424,114, Sep. 27, 1982, abandoned, which is a division of Ser. No. 228,411, Jan. 26, 1981.

[30] Foreign Application Priority Data

Jan. 30, 1980 [GB] United Kingdom ................ 8003124

[51] Int. Cl.$^4$ ..................... A23C 19/097; A23C 19/16
[52] U.S. Cl. .......................................... 426/8; 426/36; 426/582
[58] Field of Search .................. 426/8, 36, 38, 40, 582

[56] References Cited

U.S. PATENT DOCUMENTS

| | | | |
|---|---|---|---|
| 2,007,218 | 3/1933 | Seltzer | 426/582 X |
| 2,392,362 | 1/1946 | Bryant . | |
| 2,871,127 | 1/1959 | Barch | 426/582 |
| 2,872,324 | 2/1959 | Bocatelli . | |
| 3,075,842 | 1/1963 | Shaver . | |
| 4,194,011 | 3/1980 | Invernezzi et al. | 426/8 |
| 4,248,897 | 2/1981 | Christensen et al. | 426/582 X |

FOREIGN PATENT DOCUMENTS

| | | |
|---|---|---|
| 6380 | 1/1980 | European Pat. Off. . |
| 665133 | 9/1938 | Fed. Rep. of Germany . |
| 810575 | 6/1951 | Fed. Rep. of Germany . |
| 1932476 | 9/1970 | Fed. Rep. of Germany . |
| 1044183 | 11/1953 | France . |
| 1251350 | 12/1960 | France . |
| 1337214 | 8/1963 | France . |
| 1301264 | 3/1964 | France . |
| 2265282 | 10/1975 | France . |
| 2360258 | 3/1978 | France . |
| 2382196 | 9/1978 | France . |
| 748161 | 4/1956 | United Kingdom ................ 426/582 |
| 983752 | 2/1965 | United Kingdom . |
| 1261910 | 1/1972 | United Kingdom . |

OTHER PUBLICATIONS

Whistler et al, Industrial Gums, 1959, Academic Press: New York, pp. 97, 349, 366, 367.
Perkins, The Boston Cooking-School, Cook Book, 9th Ed., 1951, Little Brown & Co., Boston, pp. 170-171.
Kosikowski, Cheese and Fermented Milk Foods, 1966, publ. by the Author: Ithaca, New York, pp. 290-303, 258-277.
Whistler et al, Industrial Gums, 2nd Ed., 1973, Academic Press: New York, pp. 50, 56-57.

Primary Examiner—Joseph Golian

[57] ABSTRACT

A packaged cheese spread is prepared by mixing a natural, soft-to-medium cheese with an edible fat, a stabilizer and water. During mixing the temperature is brought to a temperature of about 125° to 130° C. at which temperature the mixing is continued for about 2 to about 10 minutes. The mixture is then cooled to from about 75° to 85° C., homogenized and packaged in sealed containers. Cheese spreads prepared in this way have good shelf life and retain the original flavor of the natural cheese.

7 Claims, No Drawings

CHEESE SPREADS

This application in a continuation of application Ser. No. 424,114, filed Sept. 27, 1982, now abandoned, which was a division of application Ser. No. 228,411, filed Jan. 26, 1981.

BACKGROUND OF THE INVENTION

1. Field of the Invention

This invention relates to packaged shelf-stable (12 weeks or more under refrigerated conditions) cheese spreads having, as the sole or major cheese ingredient, a natural cheese which normally has a relatively short shelf-life, and a process for preparing same.

2. The Prior Art

A number of natural cheeses suffer the disadvantage of poor shelf-life, the principal cause being a relatively high water content thereby providing a suitable environment for continued (during storage) action of the naturally present enzymes. Because of their water content in relation to solids content and the degree of decomposition of the protein these cheeses can be classified in terms of body, or consistency, as soft, semi-soft or medium.

Typical soft cheeses (generally known as "soft ripened cheeses") are Camembert, Brie, Liederkranz and Romadour; all are characterized by extremely poor shelf-stability.

Those having semi-soft to medium consistencies have longer shelf lives than the soft-ripened cheeses, but nevertheless substantially shorter than the hard cheeses such as Cheddar, Emmenthal, Gouda, etc. Typical cheeses in this category are Limburger and the various "blue-veined" cheeses, the veins of which are produced by the mold *Penicillium roqueforti*, such as Roquefort, Stilton, Gorgonzola, Danish Bleu, and Blue cheese. Another cheese of this type is the "nuworld" cheese, developed at the University of Minnesota and the University of Wisconsin, U.S.A., which is ripened in the presence of a white mutant of *Penicillium roqueforti*. These white mutants, and the method of preparing same, are described in the paper entitled "White Mutants of Penicillium roqueforti" by S. G. Knight, W. H. Mohr and W. C. Frazier, *J. Dairy Science* 33 (1950) pp. 929–933. Nuworld cheese is extremely similar in consistency, texture and taste to the conventional "blue-veined" cheeses, the principal difference being that the veins of nuworld cheese are white rather than blue or blue-green.

For convenience, the above-described cheeses, characterized by soft to medium consistencies and poor shelf lives, will be referred to, throughout the specification and claims, as "natural, soft-to-medium cheeses".

Various techniques have been tried, and proposed, for increasing the storage stability of these cheeses, including the application of conventional processes for preparing "process cheese", but none of these techniques have been completely successful in obtaining products having both good shelf life and the characteristic flavor of the original cheese.

Process cheeses, having consistencies of soft to semi-soft, are conventionally prepared by starting with one, but more often two or more, hard cheeses, or at least one hard cheese plus a minor amount of one or more soft to medium cheeses, removing the rind or rinds if necessary, cutting, milling, adding an edible fat such as butter, plus water, to impart the desired final consistency, plus one or more emulsifying or stabilizing agents which are customarily phosphate or citrate salts, optionally sterilizing the mass at a high temperature (about 125° C.–140° C.), bringing the temperature to about 75° C.–80° C. and agitating at this temperature to produce the desired texture and consistency, and finally filling the process cheese mass into appropriate containers or packages. The process cheese techniques produce products having very good shelf stability, normally far greater than that of the original starting material cheese or cheeses. Problems are encountered, however, if such techniques are applied to a natural, soft-to-medium cheese or a mixture containing a large proportion of such a cheese. During the processing, and particularly during the milling step, these cheeses acquire an unworkable sticky consistency and become rancid, because of their high water contents and enzyme systems.

SUMMARY OF THE INVENTION

In accordance with the present invention, a process has been developed whereby soft, spreadable, shelf-stable (at least 12 weeks at normal refrigerator temperatures, i.e. 6° C.–8° C.) cheese spreads, having as their sole or major cheese ingredient a natural, soft-to-medium cheese, can be prepared. The resulting products have flavors which are virtually indistinguishable from those of the original, natural cheeses. In a second, and preferred embodiment, which will be discussed hereinafter, the packaged products are prepared in such a way as to have, in addition to the flavor of the original natural product, an appearance very similar to that of the original product as well.

DETAILED DESCRIPTION OF THE INVENTION

In the process of the present invention, one starts with a fully ripened natural, soft-to-medium cheese, such as Roquefort, Blue cheese, Cambembert, Brie, Limburger, or the like, and first combines this (it should be noted that it is not at all necessary to remove the rinds or crusts from the natural cheeses) with an edible fat (preferably butter), one or more stabilizing agents (preferably one or more natural gums and/or gelatine, rather than the phosphate or citrate salts conventionally used in the manufacture of process cheese), water, and optionally salt. The proportions of natural cheese, butter, and water are selected to provide the final desired consistency. The resulting mixture is then brought to a temperature of about 125°–130° C. with mixing (mild agitation will suffice) over a period of a few minutes (for example, 1 minute–5 minutes), and the mixing is then continued at that temperature for a few additional minutes (2 minutes to about 10 minutes being generally sufficient). The actual times employed in this heating step will have an effect upon the final consistency of the product, and the operator can adjust them to meet his specific needs. The mass is then cooled to from about 75° C. to about 85° C. and homogenized for a short period of time at that temperature, after which it is put into appropriate containers such as cups, using conventional filling equipment, and the containers are sealed.

As has been mentioned previously, the final products are storage stable at normal refrigerator temperatures for at least 12 weeks, and have the full, rich flavors of the natural starting material cheese.

The psychological effect of the appearance of a food product upon its apparent flavor is well known, and most people, when they think of such cheeses as Roquefort, Stilton, Blue cheese and the like immediately think of the characteristic blue-green veins of these cheeses, while most people, when they think of Camembert, Brie, or any of the cheeses having outer crusts, think immediately of these characteristic outer crusts. In a preferred embodiment of the instant invention the cheese spreads prepared in accordance therewith are also given an appearance characteristic of the natural cheeses from which they have been prepared by the addition thereto of the same type of mold, yeast or bacteria responsible for the characteristic appearance. The mold, yeast or bacteria is being added in such a way and in such a form as to be "inactive" vis-a-vis the cheese spread, thereby avoiding any loss of shelf life, but so as to impart to the final packaged cheese spread the characteristic appearance of a blue-veined cheese, a Camembert with its typical crust, etc. This concept will now be explained more fully, first with respect to a cheese spread prepared from a *Penicillium roqueforti* containing cheese.

In applying the process of the invention to a *Penicillium roqueforti* cheese, it is highly desirable to use, as the principal starting material, nuworld cheese rather than a cheese having blue-green veins, because a Roquefort, Stilton, Gorgonzola or the like will, upon mixing and heating, acquire an unattractive grey color. Therefore, as mentioned, one should desirably employ the white, nuworld cheese. This cheese is processed in accordance with the invention, and can, of course, be packaged into cups as is. In order to impart a desirable appearance to the product, however, a conventional *Penicillium roqueforti* mold is separately grown, as in an aqueous medium, and then concentrated, as by evaporation or centrifugation, to form a dark blue-green color concentrate. This color concentrate is used to give the white cheese spread the appearance of the characteristic blue veins of conventional blue-veined cheeses.

The preferred method for accomplishing this is to prepare a second *Penicillium roquefort* containing cheese spread, from either nuworld cheese or a cheese having blue-green veins, and incorporating the color concentrate at any stage of the process up to, but not including, the filling operation. It is importat that the color concentrate be subjected to conditions which will inactivate the spores in order to prevent them from interacting with the cheese spread during storage. One method of accomplishing this is to subject the color concentrate to a temperature of about 125° C. the concentrate itself can be heated to this temperature prior to mixing with the cheese mass, or it can be added to the mass after it has been cooled to about 75° C.–85° C., but in this latter case the entire mass would then have to be reheated to 125° C. Therefore, in order to avoid unnecessary heating steps, and for general simplicity of operations, it is preferable to add the color concentrate to the natural cheese and other ingredients at the very start of the process, as part of the water in the formulation.

An alternative method of inactivating the spores is to freeze the color concentrate slowly to about −20° C., which slow freezing process will rupture the cells. Another advantage to freezing the color concentrate is that it can then be conveniently stored prior to use. The frozen color concentrate is then incorporated into the second cheese mass at any stage of preparation.

This second cheese mass, containing the inactivated color concentrate, designated as the "colored-phase" cheese spread, is then combined with the "white-phase" cheese spread in the following manner. During the filling operation the cups are first partially filled with the white-phase cheese spread, and are then completely filled by injecting streams of the colored-phase cheese spread throughout the white-phase, as by means of nail-type filling nozzles. The final product is a soft, spreadable, white-based mass "laced" throughout with the blue-green veins so characteristic of a natural blue-veined cheese. The dosage ratio of colored-phase spread to white-phase spread is immaterial to the practice of the invention, but, needless to say, one would not wish to use so much colored-phase as to result in a product having no resemblance to a natural blue-veined cheese.

A somewhat different technique is employed in imparting to a cheese having an outer crust such as Camembert the attractive characteristic crust and this technique shall now be described with reference to the preparation of a "Camembert spread". It will be recognized that a similar technique, employing different "crust-forming" molds or the like, can be used for other "crust-containing" cheeses.

A fully ripened, but not, of course, over-ripe Camembert, including the crust, is processed in accordance with the invention, and cups are filled with the cheese spread. Meanwhile, a suitable Penicillium mold, i.e., *Penicillium camemberti* or *Penicillium candidum*, is separately grown in an aqueous medium. This mold in its natural active state cannot, of course, be added directly to the cheese spread, because it would produce enzymes which would interact with the spread during storage, as is the case with the normal ripening process of Camembert. A suitable way to prevent this is to first place a "barrier-film" over the top of the cheese spread. This can very conveniently be accomplished, on the packaging line, by sending the filled cup to a second filling unit which sprays onto the surface a solution of a calcium-reactive material, such as sodium alginate potassium alginate, sodium carragenate, potassium carragenate, or the like, which reacts immediately with the calcium ions in the cheese mass to form an impermeable, edible film over the surface. The cups are then sent to a third filling unit which sprays the surface with the spores of the previously prepared mold, after which the cups are sealed and a small air hole, to permit the escape of carbon dioxide during the subsequent incubation, is punched into the top of each cup. The cups are then incubated at a temperature of about 20° C.–25° C. for about three to five days, during which time the mold spores grow to form, on the surface, the characteristic crust of a natural soft ripened cheese. At the end of the incubation period the cups are placed in cold storage, which prevents further growth of the mold.

Cheese spreads prepared in this manner are storage stable, at refrigerator temperatures, for at least 12 weeks, without any flavor deterioration, i.e., the development of the strong "ammonia-flavor" typical of over-ripe Camembert, occurring. The top of the cheese spread shows the characteristic whitish mold of a natural Camembert, and the spread itself has the typical creamy, consistency of Camembert.

The following examples will illustrate more fully the practice of the invention. All parts and percentages are by weight unless otherwise specified.

EXAMPLE I

Preparation of a Color Concentrate From *P. roqueforti* Mold

A modified Czapek nutrient medium (pH adjusted to 3.8 to 5.0) is employed, the composition being as follows:

2%—Saccharose
0.05%—$MgSO_4$
0.10%—$KH_2PO_4$
0.05%—KCl
0.30%—$MaNO_3$

Alternatively, deproteinized cheese whey can be employed as the nutrient medium. The medium is sterilized at 95° C. for one hour, and is then filled hot into a presterilized fermentation vessel. The fermentation vessel is equipped with means for agitating and aerating the medium. The medium is cooled slowly to the fermentation temperature, which can be between 8° C. and 30° C. A *P. roqueforti* culture is then added in an amount of from 25 cc to 50 cc/400 liters. The incubation is conducted for 3 to 5 days with strong agitation and aeration whereby the medium is kept saturated with oxygen throughout the incubation period.

The mold Mycelium is then concentrated, as by centrifugation, to approximately 20% dry substance. The concentrated mold Mycelium can then be employed in the practice of the invention or, optionally, may be frozen and stored for a later use. As was mentioned previously, the concentrate is preferably frozen slowly in order to inactivate mold.

EXAMPLE II

Preparation of *P. camemberti* mold

A commercialy available dried culture of *P. camemberti* spores is dissolved in sterilized distilled water, in an amount of 1 gr./1000 ml, and allowed to stand for 24 hours at 6° C. to 10° C. Just prior to use (i.e., just prior to its being sprayed on to the cheese mass) a saccharose solution is added in an amount to provide a final concentration of 5% saccharose. The mold is then ready for use in practice of this invention."

In all of the following examples, soft, spreadable cheese spreads, having approximately 40% total dry substance and from 50%–60% fat, based on dry substance, were prepared.

EXAMPLE III

Blue-Veined Cheese Spread,

40% Dry Substance,

50% Fat Based on Dry Substance

The following formula was employed; the amount of water set forth in the formula includes a small amount of water introduced during the heating step, by condensation of the direct steam employed.

| Ingredients | Parts by Weight |
| --- | --- |
| Nuworld cheese | 18.00 |
| Butter | 0.90 |
| Locust bean gum | 0.34 |
| Tragacanth | 0.15 |
| Gelatine (280 Bloom) | 0.9 |
| Water | 10.50 |

A Stefan cutter, equipped for direct steam injection and over-pressure to 1.6 bar, and having a jacket for cooling water, was employed. The cheese, butter, gums and gelatine were put into the Stefan cutter and the materials were mixed with cutter knives at high speed for 3 minutes. The machine was then set at the slow agitation position, the water was added, and the mixture heated via direct steam injection to 125°–130° C. and held, with continued slow agitation, for about 6 minutes at that temperature. The mass was cooled to about 75°–85° C. via indirect cooling and transferred to a pressure-less cheese homogenizer wherein it was homogenized and then pumped directly to the filling machine, the temperature throughout, including filling temperature, being maintained at about 75°–85° C. Unit portion cups, of about 150 gm. capacity, were partially filled with the white cheese mass, immediately after which the cups were completely filled by injecting into the white cheese mass a blue cooled cheese mass via nail-type nozzles, said blue colored cheese mass having been prepared as follows.

A *Penicillium roqueforti* mold had previously been grown on an aqueous nutrient medium, concentrated by centrifugation to a dry substance of about 20% and frozen. A second colored cheese mass was prepared using the same formula and the same procedure as employed for the white cheese mass, the frozen *Penicillium roqueforti* concentrate being added at the beginning of the process as a portion of the total water content. The dosage ratio of blue colored cheese mass to white cheese mass was approximately 10%.

After the cups had been completely filled they were sealed and placed in cold storage. At the end of 12 weeks storage at 6° C.–8° C., the cups were opened and the product examined. The cheese spread had a very attractive appearance, having a white base "laced" throughout with blue-green streaks, or veins. The consistency was very soft and readily spreadable. The product had an excellent, well-rounded ripe blue cheese flavor.

EXAMPLE IV

Blue-Veined Cheese Spread,

40% Dry Substance,

60% Fat Based on Dry Substance

Example III was repeated, with the following exceptions. The formula was employed as follows:

| Ingredients | Parts by Weight |
| --- | --- |
| Nuworld cheese | 18.00 |
| Butter | 5.10 |
| Salt | 0.30 |
| Locust bean gum | 0.33 |
| Tragacanth | 0.21 |
| Gelatine | 0.12 |
| Water | 11.30 |

The ratio of blue colored cheese mass to white cheese mass was about 15%.

The product, after 12 weeks storage, was very similar to that of Example III in terms of consistency, overall appearance and flavor.

EXAMPLE V

Camembert Cheese Spread,

37% Dry Substance,

50% Fat Based on Dry Substance

The following formula was employed:

| Ingredients | Parts by Weight |
|---|---|
| Camembert cheese | 12.00 |
| Butter | 1.20 |
| Salt | 0.20 |
| Locust bean gum | 0.20 |
| Tragacanth | 0.16 |
| Gelatine | 0.17 |
| Water | 8.50 |

The cheese spread was prepared by the same process as in Example III, except the cups were almost completely filled at a temperature of about 45° C.–50° C. Immediately after filling the cups were sent to a second filling unit where the surface of the cheese mass was sprayed with a sodium alginate solution. A film formed immediately upon the surface of the mass, after which the cups were sent to a third filling unit, and were sprayed with a previously grown *Penicillium camemberti* mold. The cups were then sealed and an air hole was punched into the top of each cup. The finished cups were then incubated at 20° C., 90% relative humidity, for 5 days, and then put into cold storage at 6° C.–8° C.

After 12 weeks storage the cups were opened and the product examined. Over the surface of each product there was the white edible mold characteristic of a natural Camembert cheese. Below the surface mold the spread was soft and creamy, of the same consistency as a natural Camembert at its optimal stage of ripening. The flavor of the product was virtually indistinguishable from that of a natural Camembert at its "peak" flavor, i.e., the product had a strong, typical Camembert flavor.

EXAMPLE VI

Camembert Cheese Spread,

37% Dry Substance,

60% Fat Based on Dry Substance

The process of Example V was repeated, with the following differences.

The following formula was employed:

| Ingredients | Parts by Weight |
|---|---|
| Camembert cheese | 12.00 |
| Butter | 4.20 |
| Salt | 0.25 |
| Locust bean gum | 0.22 |
| Tragacanth | 0.18 |
| Gelatine | 0.20 |
| Water | 23.00 |

The cups, filled with the cheese mass, were sprayed with a potassium carragenate solution prior to being sprayed with the *Penicillium camemberti* mold. The incubation was conducted at 25° C. for 3 days.

After 12 weeks of storage the cups were opened and the product examined. The characteristics of the product were the same as the product made in accordance with Example V.

The invention has been described and exemplified using, as the sole cheese ingredient, a natural, soft-to-medium cheese, plus, as the sole "additives", natural ingredients such as butter, vegetable gums, gelatine, and salt. It will be understood that one could employ such additional ingredients as other cheeses (e.g., cheddar), chemical preserving and/or stabilizing agents, chemical or natural flavoring agents, etc., and still be within the scope of the invention. The use of such additional materials is not preferred, however, because the process of the invention permits the preparation, without the use of any of the aforementioned additional ingredients, of shelf stable, spreadable, packaged cheese spreads having both the flavor and the appearance of such well-loved natural cheeses as Roquefort, Stilton, Camembert etc.

Having set forth the general nature and some examples of the present invention, the scope is now particularly set forth in the appended claims.

What is claimed is:

1. A process for the preparation of a packaged cheese product having improved shelf-life, desirable consistency and spread characteristics and the flavor characteristics of a natural, soft-to-medium cheese, without the addition of stabilizing salts, comprising the following steps:
    (a) combining in proportions so as to provide the final consistency desired,
        (i) a cheese component in which the sole or major constituent is a soft-to-medium, natural cheese containing a mold, yeast or bacteria to provide the characteristic flavor and appearance of the natural cheese,
        (ii) an edible fat,
        (iii) at least one stabilizing agent chosen from the group comprising natural gums and gelatine, and,
        (iv) water,
    (b) mildly agitating the mixture of ingredients listed in step (a) while increasing the temperature to about 125° C. to 130° C., which temperature will inactivate the spores of said mold, yeast or bacteria,
    (c) continuing to agitate said mixture for approximately 2 minutes to 10 minutes during which the temperature is held relatively constant, thereby avoiding any loss of shelf-life caused by said mold, yeast or bacteria, or by enzymes produced thereby,
    (d) cooling said mixture to about 75° C. to about 85° C.,
    (e) homogenizing said mixture while the temperature is held relatively constant,
    (f) partially filling and appropriate container with the homogenized mixture,
    (g) depositing an edible barrier film on the surface of the homogenized mixture to prevent interaction of mold, yeast or bacteria with the homogenized mixture,
    (h) providing an outer crust characteristic of a natural soft ripened cheese by adding a sufficient amount of said mold, yeast or bacteria to the surface of the homogenized mixture,
    (i) incubating the product thus formed to permit the growth of a crust over the surface thereof, and
    (j) sealing the container.

2. The process of claim 1 in which the edible barrier film is formed by applying a solution of an edible, calcium-reactive material onto the surface of the homogenized mixture, which calcium-reactive material reacts immediately with calcium ions present in the homogenized mixture to form an impermeable film over the surface of such homogenized material.

3. The process of claim 2 wherein said calcium-reactive material is chosen from the group consisting of sodium alginate, potassium alginate, sodium carragenate, and potassium carragenate.

4. A process for the preparation of a packaged cheese product having improved shelf-life, desirable consistency and spread characteristics and the flavor characteristics of a natural, soft-to-medium cheese, without the addition of stabilizing salts, comprising the following steps:
   (a) combining in proportions so as to provide the final consistency desired,
      (i) a cheese component in which the sole or major constituent is a soft-to-medium, natural cheese containing a mold, yeast or bacteria to provide the characteristic flavor and appearance of the natural cheese,
      (ii) an edible fat,
      (iii) at least one stabilizing agent chosen from the group comprising natural gums and gelatine, and
      (iv) water,
   (b) mildly agitating the mixture of ingredients listed in step (a) while increasing the temperature to about 125° C. to 130° C., which temperature will inactivate the spores of said mold, yeast or bacteria,
   (c) continuing to agitate said mixture for approximately 2 minutes to 10 minutes during which the temperature is held relatively constant, thereby avoiding any loss of shelf-life caused by said mold, yeast or bacteria, or by enzymes produced thereby,
   (d) cooling said mixture to about 75° C. to about 85° C.,
   (e) homogenizing said mixture while the temperature is held relatively constant,
   (f) partially filling an appropriate container with the homogenized mixture,
   (g) depositing an edible barrier film on the surface of the homogenized mixture to prevent interaction of mold, yeast or bacteria with the homogenized mixture,
   (h) providing an outer crust characteristic of a natural soft ripened cheese by adding a sufficient amount of said mold, yeast or bacteria to the surface of the homogenized mixture,
   (i) sealing the container,
   (j) punching an air hole in the top of the container to permit the escape of carbon dioxide,
   (k) incubating the product thus formed at a temperature of about 20° C.–25° C. for about three days to permit the growth of the crust over the surface thereof, and
   (l) placing the container in cold storage to prevent further growth of said mold, yeast or bacteria.

5. The process of claim 4 in which the edible barrier film is formed by applying a solution of an edible, calcium-reactive material onto the surface of the homogenized mixture, which calcium-reactive material reacts immediately with calcium ions present in the homogenized mixture to form an impermeable film over the surface of such homogenized material.

6. The process of claim 5 wherein said calcium-reactive material is selected from the group consisting of sodium alginate, potassium alginate, sodium carragenate, and potassium carragenate.

7. A process for the preparation of a camembert cheese spread having improved shelf-life, desirable consistency and spread characteristics and the flavor characteristics of a natural camembert cheese, without the addition of stabilizing salts, comprising the following steps:
   (a) combining the following ingredients in parts by weight; 12.00 camembert cheese, 1.20 butter, 0.20 salt, 0.20 locust bean gum, 0.16 tragacanth, 0.17 gelatine, and mixing said ingredients for 3 minutes,
   (b) mildly agitating the mixture of ingredients listed in step (a), while adding 8.50 parts by weight of water, and heating the mixture to about 125° C. to 130° C.,
   (c) continuing to agitate said mixture for approximately 6 minutes whle holding the temperature relatively constant, thereby avoiding any loss of shelf-life caused by said mold, or by enzymes produced thereby,
   (d) cooling said mixture to about 75° C. to 85° C.,
   (e) homogenizing said mixture while the temperature is held relatively constant,
   (f) partially filling an appropriate container with the homogenized mixture at a temperature of about 45° C. to 50° C.,
   (g) depositing an edible barrier film, comprising a sodium alginate solution, on the surface of the homogenized mixture to prevent interaction of said mold with the homogenized mixture,
   (h) providing an outer crust characteristic of a natural camembert cheese by adding a sufficient amount of *Penicillium camemberti* mold to the surface of the homogenized mixture,
   (i) sealing the container,
   (j) punching the air hole in the top of the container to permit the escape of carbon dioxide,
   (k) incubating the product thus formed at a temperature of about 20° C. at 90% relative humidity for about 5 days to permit the growth of the crust over the surface thereof, and
   (l) placing the container in cold storage at a temperature of 6° C. to 8° C. to prevent further growth of said *Penicillium camemberti* mold.

* * * * *

UNITED STATES PATENT AND TRADEMARK OFFICE
CERTIFICATE OF CORRECTION

PATENT NO. : 4,568,548

DATED : February 4, 1986

INVENTOR(S) : Max Sprenger

It is certified that error appears in the above-identified patent and that said Letters Patent is hereby corrected as shown below:

Column 3, line 48, "the" should read -- The --.

Column 4, line 40, after "alginate" insert -- , --.

Column 10, line 22, between "0.16" and "tragacanth" insert a space.

Column 10, line 29, "whle" should read -- while --.

Signed and Sealed this

Twenty-fifth Day of November, 1986

Attest:

DONALD J. QUIGG

Attesting Officer     Commissioner of Patents and Trademarks